US010734700B2

(12) United States Patent
Tiwari et al.

(10) Patent No.: US 10,734,700 B2
(45) Date of Patent: Aug. 4, 2020

(54) APPARATUS, SYSTEM, AND METHOD FOR POINTING WIRELESS COMMUNICATION ANTENNAS

(71) Applicant: Facebook, Inc., Menlo Park, CA (US)

(72) Inventors: Abhishek Tiwari, Oak Park, CA (US); Steven Andrew Cashion, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 405 days.

(21) Appl. No.: 15/796,585

(22) Filed: Oct. 27, 2017

(65) Prior Publication Data

US 2019/0131686 A1    May 2, 2019

(51) Int. Cl.
*H01Q 1/12* (2006.01)
*H01Q 3/08* (2006.01)
*G01S 13/44* (2006.01)
*H01Q 1/24* (2006.01)

(52) U.S. Cl.
CPC ....... *H01Q 1/1257* (2013.01); *G01S 13/4454* (2013.01); *H01Q 1/1242* (2013.01); *H01Q 3/08* (2013.01); *H01Q 1/246* (2013.01)

(58) Field of Classification Search
CPC ....... H01Q 1/1242; H01Q 1/125–1264; H01Q 3/08; G01S 13/4454
USPC .......................................................... 342/359
See application file for complete search history.

(56) References Cited

U.S. PATENT DOCUMENTS

| 3,088,697 | A  | * | 5/1963 | Cutler  | H01Q 1/1257 244/165 |
| 6,690,917 | B2 |   | 2/2004 | Soliman et al. | |
| 8,022,885 | B2 |   | 9/2011 | Smoyer et al. | |
| 8,193,983 | B1 | * | 6/2012 | Farmer  | H01Q 1/246 342/367 |
| 2003/0092380 | A1 | * | 5/2003 | Soliman | G01S 3/14 455/12.1 |
| 2008/0001835 | A1 |   | 1/2008 | Boucher | |

(Continued)

OTHER PUBLICATIONS

M.I. Skolnick, Radar Handbook, McGraw-Hill Professional Publishing, Third Edition, chapter 9, 2008 (Year: 2008).*

(Continued)

*Primary Examiner* — Bernarr E Gregory
*Assistant Examiner* — Fred H Mull
(74) *Attorney, Agent, or Firm* — FisherBroyles, LLP

(57) ABSTRACT

An apparatus for pointing wireless communication antennas may include (1) a mount that secures (A) a wireless communication antenna that transmits wireless communication signals to a remote wireless communication antenna that is secured on a remote mount and (B) an array of pointing antennas that receives, from a remote array of pointing antennas mounted on the remote mount, a beacon signal that indicates a location of the remote array of pointing antennas, (3) a motorized drive that physically orients the mount, and (4) a processing device that (A) determines, based at least in part on the beacon signal, an orientation of a boresight axis of the wireless communication antenna relative to a boresight axis of the remote wireless communication antenna and (B) directs the motorized drive to orient the mount such that the wireless communication antenna's boresight axis aligns with the remote wireless communication antenna's boresight axis.

20 Claims, 8 Drawing Sheets

(56) References Cited

U.S. PATENT DOCUMENTS

| | | | | |
|---|---|---|---|---|
| 2009/0102743 A1* | 4/2009 | Hager | ........... | H01Q 1/1242 343/890 |
| 2013/0009832 A1* | 1/2013 | Apostolos | ........... | H01Q 1/273 343/730 |
| 2014/0227966 A1* | 8/2014 | Artemenko | ........... | H01Q 1/1257 455/9 |
| 2014/0347235 A1* | 11/2014 | Yang | ........... | H01Q 1/1242 343/760 |
| 2016/0134006 A1 | 5/2016 | Ness et al. | | |

OTHER PUBLICATIONS

K. Balasubramanian et al., Auxiliary Array Tracking System for Reflecting Antennas, IEEE Transactions on Consumer Electronics, vol. 39(2), p. 93-99, 1993 (Year: 1993).*

* cited by examiner

Method 800

Start

Receive, by an array of pointing antennas coupled to a mount that secures a wireless communication antenna, a beacon signal that indicates a location of a remote array of pointing antennas, where (1) the remote array of pointing antenna is coupled to a remote mount that secures a remote wireless communication antenna and (2) the remote array of pointing antennas transmits the beacon signal via a different communication channel than a communication channel used by the wireless communication antenna
810

Determine, based at least in part on the received beacon signal, an orientation of a boresight axis of the wireless communication antenna relative to a boresight axis of the remote wireless communication antenna
820

Orient the mount such that the boresight axis of the wireless communication antenna aligns with the boresight axis of the remote wireless communication antenna
830

End

*FIG. 8*

APPARATUS, SYSTEM, AND METHOD FOR POINTING WIRELESS COMMUNICATION ANTENNAS

BACKGROUND

Mobile network carriers, Internet service providers, broadcasting organizations, and various other communications enterprises often utilize wireless communication antennas to provide communication services for their clients and customers. These antennas may facilitate network connections, mobile communication, and other services for vast numbers of individuals worldwide. In some examples, antennas may be secured on communication towers that increase the range and/or performance of the antennas. For example, a radio tower may secure antennas at a high elevation that optimizes radio signal transmission. In addition, a communications tower may be used to angle or direct an antenna towards a remote antenna such that the pair of antennas may efficiently transmit wireless signals.

Traditional systems for mounting antennas on communication towers may require technicians to climb the towers while installing, orienting, and servicing the antennas. Unfortunately, climbing communication towers is a potentially dangerous (and even deadly) job. In addition to the risk of injury by falling from great heights, tower-climbing technicians may be exposed to threats such as unsafe levels of radiation and/or electricity. Due to the extreme risks of tower-climbing, installing, uninstalling, and adjusting antennas may generally be difficult and/or expensive. As such, wireless service providers that utilize antennas installed on towers may be unable to efficiently adjust the services they provide to meet the varying demands of consumers. The instant disclosure, therefore, identifies and addresses a need for improved systems for mounting and pointing wireless communication antennas.

SUMMARY

As will be described in greater detail below, the instant disclosure describes various apparatuses, systems, and methods for pointing wireless communication antennas. In particular, the instant disclosure describes a wireless communication mount (e.g., a "smart mount") that secures (1) a communication antenna and (2) an array of pointing antennas that facilitates efficient and automatic alignment of the boresight axis of the antenna with the boresight axis of a remote antenna. In addition, the instant disclosure describes a wireless communication tower (e.g., a "smart tower") equipped with an elevator mechanism that installs and/or repositions individual mounts and antennas that are hosted on the tower.

In one example, an apparatus for pointing wireless communication antennas may include (1) a mount that secures (A) a wireless communication antenna that transmits, via a communication channel, wireless communication signals to a remote wireless communication antenna that is secured on a remote mount and (B) an array of pointing antennas that receives, from a remote array of pointing antennas mounted on the remote mount, a beacon signal that indicates a location of the remote array of pointing antennas, the beacon signal being received via a different communication channel than the communication channel used by the wireless communication antenna, (2) at least one motorized drive that physically orients the mount, and (3) a physical processing device that is communicatively coupled to the motorized drive and that (A) determines, based at least in part on the received beacon signal, an orientation of a boresight axis of the wireless communication antenna relative to a boresight axis of the remote wireless communication antenna and (B) directs the motorized drive to orient the mount such that the boresight axis of the wireless communication antenna aligns with the boresight axis of the remote wireless communication antenna.

In one example, the different communication channel used by the remote array of pointing antenna may transmit wireless communication signals whose frequencies are within a different frequency range than a frequency range of the wireless communication signals transmitted via the communication channel used by the wireless communication antenna.

In one embodiment, the beacon signal may transmit geolocation data that identifies the location of the remote array of pointing antennas. The physical processing device may use this geolocation data to direct the motorized drive to point the mount towards the remote mount. In one example, the geolocation data may include Global Positioning System (GPS) and/or Inertial Navigation System (INS) data.

In one embodiment, the array of pointing antennas may include at least two pointing antennas that each receive the beacon signal. In this embodiment, the beacon signal may represent a monopulse radar signal. The physical processing device may determine, for each pointing antenna within the array of pointing antennas, a phase of the monopulse radar signal received at the pointing antenna. The physical processing device may then determine the orientation of the boresight axis of the wireless communication antenna relative to the boresight axis of the remote wireless communication antenna based on a comparison between the determined phases. The physical processing device may also direct the motorized drive to orient the mount such that the phases of the monopulse radar signal received at each pointing antenna align with each other.

In one example, the wireless communication antenna and the array of pointing antennas may be rigidly mounted adjacently to each other on the mount. In this example, the physical processing device may determine an offset of the boresight axis of the wireless communication antenna relative to an axis of the array of pointing antennas. Specifically, the physical processing device may determine this offset by (1) determining, based on the received beacon signal, an orientation of the mount that aligns the axis of the array of pointing antennas with an axis of the remote array of pointing antennas, (2) performing a signal strength analysis on a wireless communication signal transmitted between the remote wireless communication antenna and the wireless communication antenna, and (3) determining, based on the signal strength analysis, an adjustment to the orientation of the mount that maximizes the strength of the wireless communication signal. The physical processing device may then direct the motorized drive to correct the offset of the boresight axis of the wireless communication antenna relative to the axis of the array of pointing antennas based on the determined adjustment to the orientation of the mount.

In one embodiment, the mount may be hosted on a tower. This tower may include an elevator mechanism that transports the mount between a base of the tower and a location at which the mount is installed on the tower. In some examples, the elevator mechanism may transport the mount independently of at least one additional mount that is also hosted on the tower.

In one embodiment, a system for pointing wireless communication antennas may include (1) a tower, (2) a mount that is hosted on the tower and that secures (A) a wireless communication antenna that transmits, via a communication channel, wireless communication signals to a remote wireless communication antenna that is secured on a remote mount, (B) an array of pointing antennas that receives, from a remote array of pointing antennas mounted on the remote mount, a beacon signal that indicates a location of the remote array of pointing antennas, with the beacon signal being received via a different communication channel than the communication channel used by the wireless communication antenna, (C) at least one motorized drive that physically orients the mount, and (D) a physical processing device that is communicatively coupled to the motorized drive and that (I) determines, based at least in part on the received beacon signal, an orientation of a boresight axis of the wireless communication antenna relative to a boresight axis of the remote wireless communication antenna and (II) directs the motorized drive to orient the mount such that the boresight axis of the wireless communication antenna aligns with the boresight axis of the remote wireless communication antenna, and (3) an elevator mechanism that (A) transports the mount between a base of the tower and a location at which the mount is installed on the tower and (B) transports the mount independently of at least one additional mount that is hosted on the tower.

In one example, the physical processing device may determine a health status of at least one component secured to the mount. The physical processing device may then communicate the health status to a wireless communications enterprise that manages the component.

In one embodiment, the tower may include a cable-management system that includes at least one additional physical processing device. This physical processing device may (1) determine locations at which to install mounts hosted on the tower and (2) direct the elevator mechanism to install the mounts at the determined locations.

In one example, the cable-management system may direct the elevator mechanism to install the additional mount at a location that reduces interference between the wireless communication signals transmitted by the wireless communication antenna and wireless communication signals transmitted by an additional wireless communication antenna that is secured on the additional mount. In another example, the cable-management system may direct the elevator mechanism to adjust the location at which the mount is installed on the tower based on detecting a change in wireless communication services required within a coverage area serviced by the wireless communication antenna. Additionally or alternatively, the cable-management system may direct the elevator mechanism to adjust the location at which the mount is installed on the tower based on identifying, between the wireless communication antenna and the remote wireless communication antenna, an obstacle capable of interfering with the wireless communication signals transmitted by the wireless communication antenna.

In one embodiment, the tower may provide multiple mount installation locations that facilitate various levels of performance for wireless communication antennas. In this embodiment, a communications tower enterprise that manages the tower may charge a higher amount of rent to install wireless communication antennas at locations that facilitate a higher performance level than an amount of rent charged to install wireless communication antennas at locations that facilitate lower performance levels. Accordingly, the cable-management system may direct the elevator mechanism to install the mount at a location that facilitates a performance level corresponding to an amount of rent paid by a communications tower client that manages the mount.

In addition, a corresponding method for pointing wireless communication antennas may include (1) receiving, by an array of pointing antennas coupled to a mount that secures a wireless communication antenna, a beacon signal that indicates a location of a remote array of pointing antennas, where (A) the remote array of pointing antennas is coupled to a remote mount that secures a remote wireless communication antenna and (B) the remote array of pointing antennas transmits the beacon signal via a different communication channel than a communication channel used by the wireless communication antenna, (2) determining, based at least in part on the received beacon signal, an orientation of a boresight axis of the wireless communication antenna relative to a boresight axis of the remote wireless communication antenna, and then (3) orienting the mount such that the boresight axis of the wireless communication antenna aligns with the boresight axis of the remote wireless communication antenna.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 8 is a flow diagram of an exemplary method for pointing wireless communication antennas.

Figure 1:
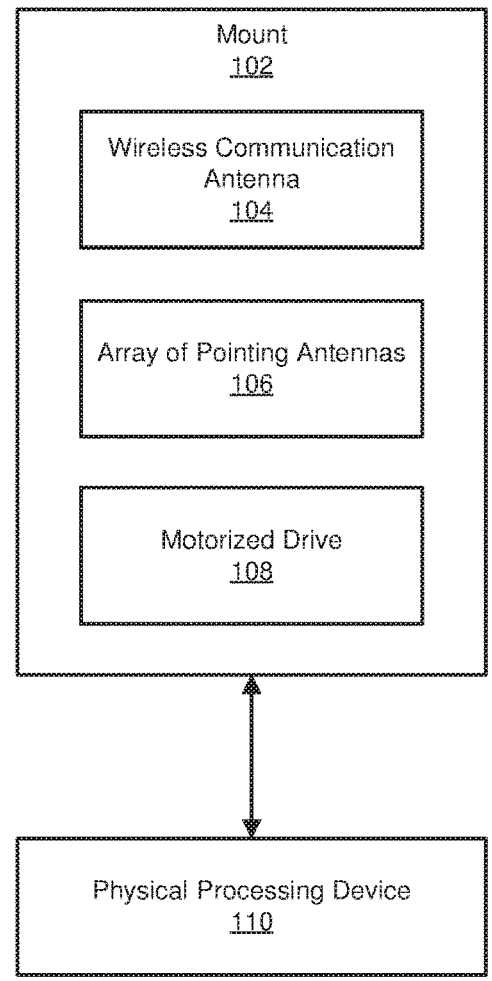
FIG. 1 is a block diagram of an exemplary apparatus for pointing wireless communication antennas.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for pointing wireless communication antennas. As will be explained in greater detail below, embodiments of the instant disclosure may automatically and efficiently align the boresight axes of a pair of wireless communication antennas. To perform this task, a mount that secures one of the communication antennas may be equipped with an array of pointing antennas. This array may receive a radar signal (the frequency of which may be outside of the frequency range utilized by the communication antennas) from a remote mount that hosts the other communication antenna. Based on the radar signal, the mount may determine a location and/or an orientation of the communication antenna relative to the remote communication antenna. The mount may then adjust the position and/or angle of the communication antenna such that the boresight axes of the two communication antennas align. In this way, the disclosed systems may maximize the strength of signals transmitted between the communication antennas. In addition, by utilizing different frequency ranges, the signals transmitted and received by the array may not interfere with (or consume the bandwidth of) the communication antennas.

Embodiments of the instant disclosure may also incorporate elevator mechanisms into towers that host multiple wireless communication antennas. These elevator mechanisms may be capable of independently positioning and installing individual antennas within the towers. Accordingly, the elevator mechanisms may facilitate efficient and granular installation, replacement, and/or adjustment of antennas installed on communication towers.

In some examples, third-party wireless communication vendors may use and/or rent antennas hosted on the disclosed communication towers. By automatically installing and orienting antennas managed by the third-party vendors, the disclosed systems may enable the vendors to provide inexpensive and/or adaptable communication services for consumers. In addition, the disclosed antenna mounts may facilitate operation of various types of antennas, thereby enabling vendors to efficiently replace or switch the type of antenna hosted on a mount without requiring modifications to other components of the mount.

Additionally, the disclosed elevator mechanisms and self-orienting antenna mounts may eliminate the need for technicians to climb radio towers for the purpose of installing, replacing, servicing, and/or pointing antennas. As such, these systems may vastly improve the safety and working conditions of the technicians. In addition, by automatically installing and orienting wireless communication antennas, the disclosed systems may greatly reduce the cost of operating and maintaining wireless communication towers. As such, these systems may facilitate the spread and development of wireless communication services.

Figure 2:
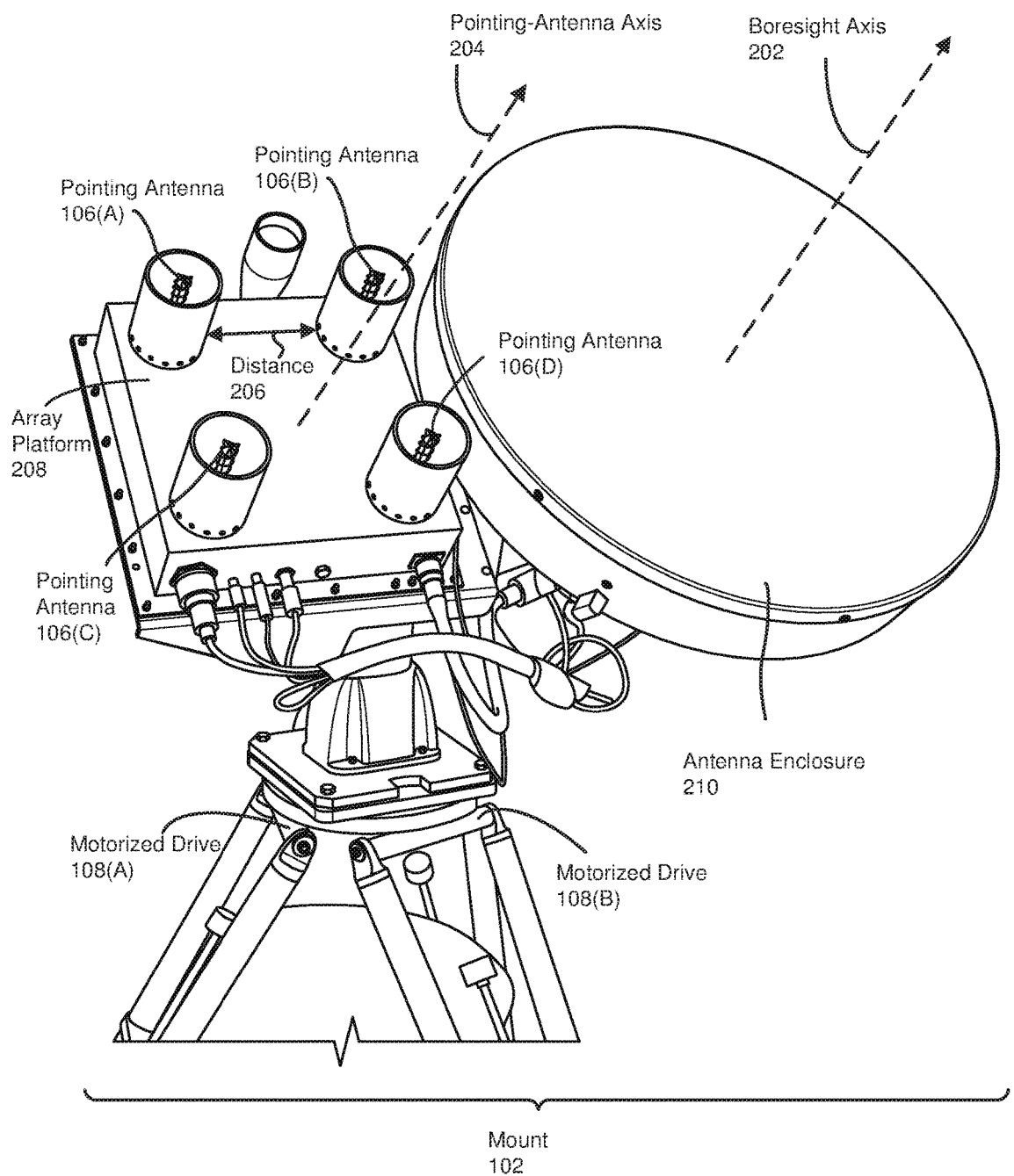
FIG. 2 is an illustration of an exemplary apparatus for pointing wireless communication antennas.

The following will provide, with reference to FIGS. 1 and 2, detailed descriptions of exemplary apparatuses for pointing wireless communication antennas. Detailed descriptions of exemplary systems for pointing wireless communication antennas will be provided in connection with FIGS. 3, 4, 6, and 7. In addition, detailed descriptions of exemplary beacon signals received by an array of pointing antennas will be provided in connection with FIG. 5. Finally, detailed descriptions of exemplary methods for pointing wireless communication antennas will be provided in connection with FIG. 8.

FIG. 1 shows an exemplary apparatus 100 for pointing wireless communication antennas. As shown in FIG. 1, apparatus 100 may include a mount 102. Mount 102 generally represents any type or form of structure, base, or other mechanism that holds, secures, orients, and/or points one or more wireless communication antennas. As will be explained in greater detail below, mount 102 may be hosted and/or installed on a wireless communication tower that facilitates operation of multiple wireless communication antennas.

In the example of FIG. 1, mount 102 may secure a wireless communication antenna 104. Wireless communication antenna 104 generally represents any type or form of device that radiates and/or receives electromagnetic waves. In one embodiment, wireless communication antenna 104 may represent and/or function as an interface for a communication device (e.g., a radio). For example, wireless communication antenna 104 may amplify and/or direct electromagnetic waves generated by a communication device such that the electromagnetic waves are received at a remote communication device (e.g., via an additional wireless communication antenna coupled to the remote device). Examples of wireless communication antenna 104 include, without limitation, directional antennas, omni-directional antennas, semi-directional antennas, dipole antennas, patch antennas, sector antennas, parabolic antennas, combinations of one or more of the same, variations of one or more of the same, and/or any additional type of antenna.

Antenna 104 may transmit signals whose frequencies correspond to any frequency value and/or frequency range. In some examples, antenna 104 may transmit signals whose frequencies fall within a radio frequency range (i.e., 3 kHz-300 GHz). For example, antenna 104 may transmit L band signals (signals with frequencies between 1 and 2 GHz), K band signals (signals with frequencies between 18 and 27 GHz), and/or signals corresponding to any additional radio frequency band. In other examples, antenna 104 may transmit signals with frequencies that fall outside of a radio frequency range.

In some embodiments, all or a portion of the signals transmitted by antenna 104 may be directed along a boresight axis of antenna 104. The term "boresight axis," as used herein, generally refers to any angle or direction corresponding to the maximum gain (e.g., amplification) of signals transmitted by an antenna. Accordingly, the strength of signals transmitted between two antennas may be maximized if the boresight axes of the two antennas are aligned.

Mount 102 may include one or more components designed to adjust the orientation and/or alignment of the boresight axis of antenna 104. For example, mount 102 may include at least one motorized drive 108. Motorized drive 108 generally represents any type or form of mechanism, motor, or machinery capable of changing the position, direction, angle, and/or orientation of antenna 104 and/or mount 102.

As shown in FIG. 1, mount 102 may also include an array of pointing antennas 106. Array of pointing antennas 106 generally represents any group or number of wireless communication antennas that radiate and/or receive electromagnetic waves. In one example, array 106 may be used to orient and/or point wireless communication antenna 104. For example, array 106 may receive, from an additional array of pointing antennas that is coupled to a remote wireless communication antenna, a signal that indicates the location and/or orientation of the remote antenna. As will be explained in greater detail below, the disclosed systems may use this signal to align the boresight axis of antenna 104 with a boresight axis of the remote antenna.

The pointing antennas within array 106 may transmit and receive signals whose frequencies correspond to any frequency value and/or frequency range. In some examples, array 106 may be configured to utilize a different frequency range than the frequency range utilized by antenna 104. For example, array 106 may transmit and receive signals whose frequencies fall within a narrow frequency range that is not within a broadband radio frequency range utilized by antenna 104. As such, the signals transmitted and received by array 106 may not interfere with, nor consume any of the bandwidth of, the signals transmitted and received by antenna 104.

Mount 102 may also include a physical processing device 110. Physical processing device 110 generally represents any type or form of hardware-implemented processing unit capable of interpreting and/or executing computer-readable instructions. In one example, physical processing device 110 may access, monitor, and/or control all or a portion of the components of mount 102. For example, physical processing device 110 may direct the movement of motorized drive 108. Additionally or alternatively, physical processing device 110 may monitor signals received by antenna 104 and/or array 106. Examples of physical processing device 110 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

FIG. 2 illustrates an exemplary embodiment of apparatus 100. Specially, FIG. 2 illustrates how the components of mount 102 may be positioned and/or secured. In the example of FIG. 2, antenna 104 from FIG. 1 may be contained within an antenna enclosure 210. Antenna enclosure 210 generally represents any covering or housing that protects and/or focuses antenna 104. In one embodiment, antenna enclosure 210 may facilitate directing all or a portion of the signals transmitted by antenna 104 along a boresight axis 202. As will be explained in greater detail below, the direction of boresight axis 202 may be changed by adjusting the orientation of mount 102.

In the example of FIG. 2, array of pointing antennas 106 may include four antennas (i.e., pointing antennas 106(A-D)). As shown in FIG. 2, pointing antennas 106(A-D) may be secured on an array platform 208. In one embodiment, array platform 208 may secure pointing antennas 106(A-D) such that each antenna is pointed in the same direction (e.g., along a pointing-antenna axis 204). In some examples, and as will be explained in greater detail below, pointing-antenna axis 204 may correspond to the boresight axis of pointing antennas 106(A-D). In general, array 106 may include any number of pointing antennas that facilitate determining both the azimuth (e.g., horizontal) orientation and elevation (e.g., vertical) orientation of pointing-antenna axis 204 and/or boresight axis 202.

FIG. 2 also illustrates a motorized drive 108(A) and a motorized drive 108(B). In one example, motorized drive 108(A) may enable adjustments to the horizontal orientation of mount 102 and motorized drive 108(B) may enable adjustments to the vertical orientation of mount 102. Apparatus 100 may also include any number of additional motorized drives not illustrated in FIG. 2.

In the example of FIG. 2, antenna 104 and array 106 may be rigidly mounted adjacent to each other on mount 102. In this way, movement of motorized drives 108(A) and/or 108(B) may produce identical changes in the orientation of both boresight axis 202 and pointing-antenna axis 204. In some embodiments, boresight axis 202 and pointing-antenna axis 204 may be parallel (or almost parallel). For example, mount 102 may be designed such that boresight axis 202 is aligned with pointing-antenna axis 204. However, due to manufacturing tolerances and/or errors, the orientation of boresight axis 202 may be at an offset relative to the orientation of pointing-antenna axis 204 (e.g., by an amount such as 0.5°, 1°, etc.). As will be explained in greater detail below, embodiments of the instant disclosure may identify and then account for this offset when aligning boresight axis 202 with the boresight axis of a remote antenna.

Figure 3:
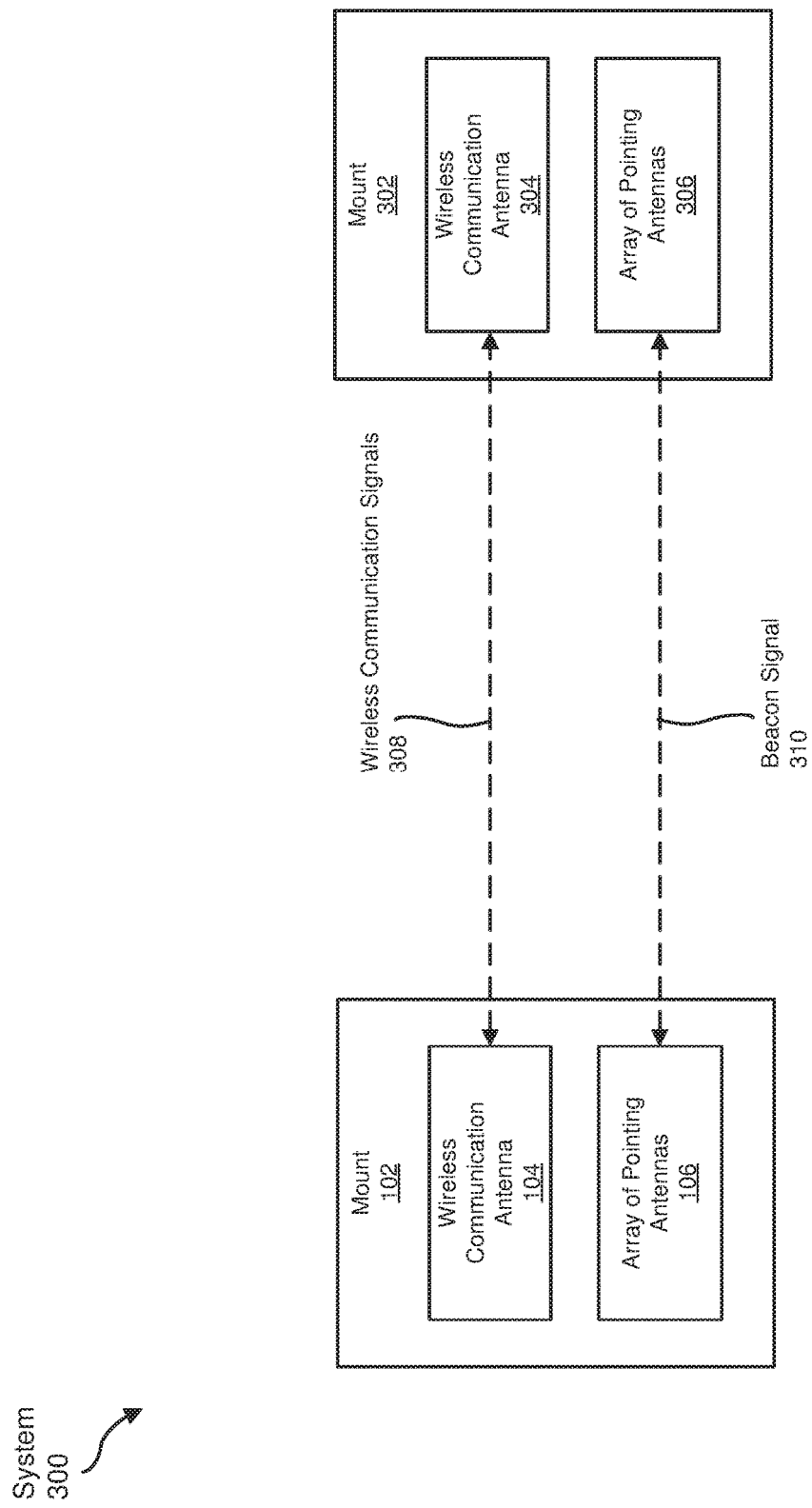
FIG. 3 is a block diagram of an exemplary system for pointing wireless communication antennas.

FIG. 3 shows an exemplary system 300 that includes mount 102 and a mount 302. Mount 302 may be located remotely from mount 102 at any distance suitable for wireless communication, such as several hundred feet or several dozen miles. As shown in FIG. 3, mount 302 may include a wireless communication antenna 304 and an array of pointing antennas 306. Antenna 304 and array 306 may generally be similar to antenna 104 and array 106, respectively.

In the example of FIG. 3, wireless communication signals 308 may be transmitted between antenna 104 and antenna 304. Antenna 104 and/or antenna 304 may also forward wireless communication signals 308 to one or more additional wireless communication antennas or devices not shown in FIG. 3. Signals 308 generally represent any electromagnetic waves whose frequencies correspond to a frequency range (e.g., a radio frequency range) utilized by antennas 104 and 304. In one embodiment, signals 308 may represent and/or include data transmitted by clients or customers of an enterprise that manages antennas 104 and 304.

As shown in FIG. 3, array 106 may receive a beacon signal 310 from array 306. Beacon signal 310 generally represents any type or form of signal that indicates a location and/or orientation of mount 302, antenna 304, and/or array 306. In one example, beacon signal 310 may contain geo-location data (such as GPS data and/or INS data) that identifies the physical location of mount 302. Additionally or alternatively, beacon signal 310 may represent a radar signal. In one embodiment, beacon signal 310 may represent a monopulse radar signal that facilitates identifying the location of array 306 using a single pulse.

In some embodiments, array 306 may transmit beacon signal 310 to array 106 as part of and/or during the process of configuring a communication channel between antenna 104 and antenna 304. For example, after mount 102 and mount 302 have been installed (e.g., on separate wireless communication towers), array 306 may transmit beacon signal 310 to array 106. Based at least in part on an analysis of beacon signal 310, physical processing device 110 may determine an orientation of boresight axis 202 of antenna 104 relative to a boresight axis of antenna 304. Physical processing device 110 may then direct motorized drives 108(A) and/or 108(B) to orient mount 102 such that the boresight axes align, thereby maximizing the strength of signals 308 transmitted between antenna 104 and antenna 304.

Figure 4:
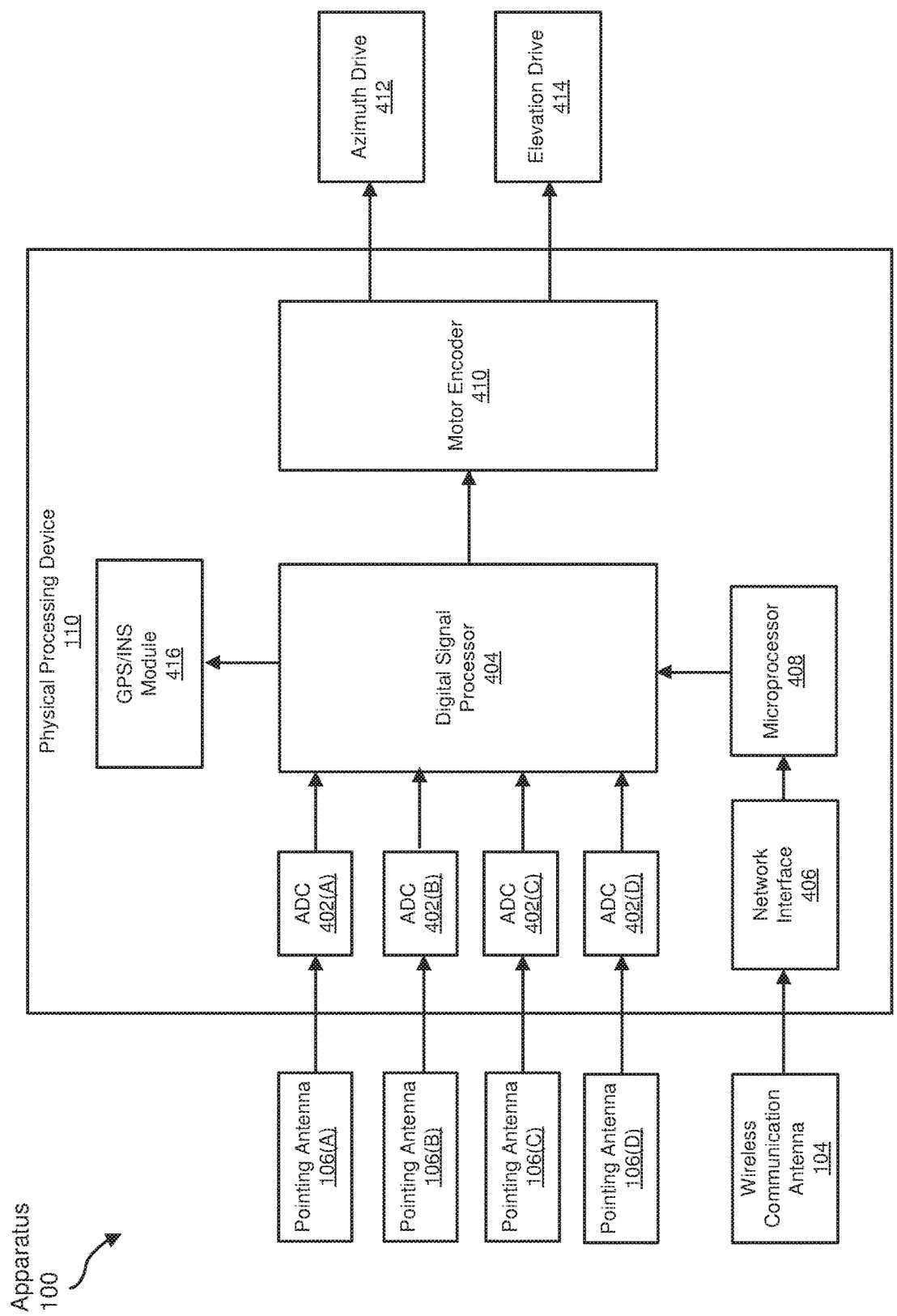
FIG. 4 is an additional block diagram of an exemplary apparatus for pointing wireless communication antennas.

FIG. 4 shows various hardware and software components of apparatus 100. In particular, FIG. 4 illustrates components of physical processing device 110 that may be used to determine and/or adjust the orientation of boresight axis 202. In the example of FIG. 4, each of pointing antennas 106(A-D) may receive beacon signal 310. Pointing antennas 106(A-D) may then transmit their received versions of beacon signal 310 to physical processing device 110. Specifically, each of pointing antennas 106(A-D) may be coupled to an Analog-to-Digital Converter (ADC) that is within and/or connected to physical processing device 110. In the example of FIG. 4, ADCs 402(A-D) may convert the received instances of beacon signal 310 to digital signals and then pass the converted signals to a digital signal processor 404. Digital signal processor 404 generally represents any physical processing device and/or portion of executable code that is capable of receiving and analyzing digital signals.

Processor 404 may identify the location and/or orientation of antenna 304 based on beacon signal 310 in a variety of ways. In one embodiment, processor 404 may determine that beacon signal 310 contains a direct indication of the location of antenna 304. For example, processor 404 may determine that beacon signal 310 includes GPS and/or INS data that may be used to identify GPS coordinates of mount 302. In one embodiment, processor 404 may identify the GPS coordinates of mount 302 based on an analysis of beacon signal 310 performed by a GPS/INS module 416. GPS/INS module 416 generally represents any processing device and/or dedicated portion of executable code that is part of and/or in communication with processor 404.

In some embodiments, processor 404 may use the physical location of mount 302 to point antenna 104 towards the location of antenna 304. For example, processor 404 may determine an orientation of boresight axis 202 relative to a boresight axis of antenna 304 based on a comparison between the GPS coordinates of mount 302 and GPS coordinates of mount 102. The GPS coordinates of mount 102 may be stored within and/or accessible to physical processing device 110. After determining the orientation of boresight axis 202 relative to the boresight axis of antenna 304, processor 404 may direct an azimuth drive 412 and an elevation drive 414 (corresponding to motorized drives 108(A) and 108(B)) to adjust the orientation of mount 102 such that the boresight axes are at least partially aligned. For example, processor 404 may direct a motor encoder 410 to generate instructions that enable azimuth drive 412 and/or elevation drive 414 to appropriately point, direct, and/or tilt antenna 104 towards antenna 304.

In some examples, mount 302 may include an instance of physical processing device 110 that facilitates adjusting the orientation of antenna 304. For example, physical processing device 110 on mount 302 may direct one or more motorized drives on mount 302 to rotate and/or tilt mount 302 such that antenna 304 is pointed towards antenna 104 (e.g., based on GPS coordinates of mount 102 received from array 106). In this way, mount 102 and mount 302 may collaborate and/or cooperate to maximize the alignment of antenna 104 and antenna 304.

In some embodiments, physical processing device 110 may precisely adjust the orientation of mount 102 based on a comparison of the versions of beacon signal 310 received at two or more of pointing antennas 106(A-D). For example, in the event that beacon signal 310 represents a monopulse radar signal, physical processing device 110 may utilize phase-comparison techniques to determine the orientation of pointing-antenna axis 204 relative to a pointing-antenna axis of array 306. Physical processing device 110 may then direct azimuth drive 412 and/or elevation drive 414 to adjust mount 102 such that the pointing-antenna axes are in alignment.

Figure 5:
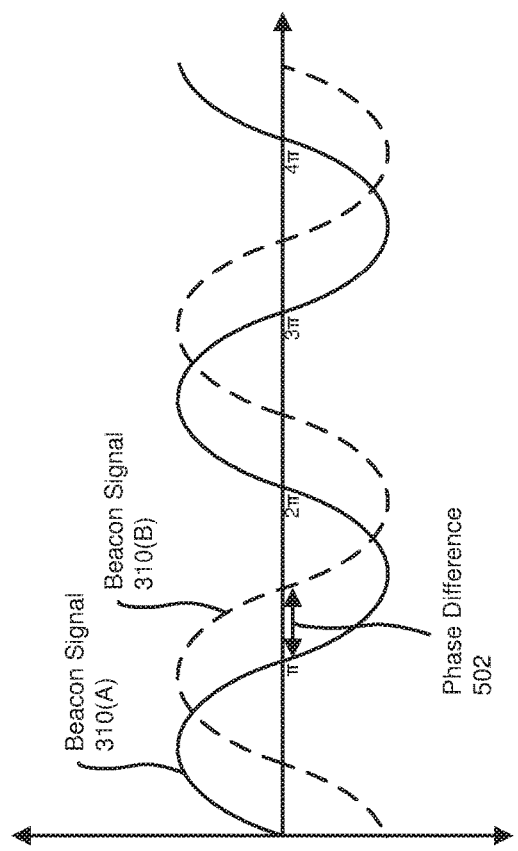
FIG. 5 is a diagram of exemplary beacon signals received by an array of pointing antennas.

FIG. 5 shows a diagram 500 that illustrates exemplary sinusoidal waveforms representative of two instances of beacon signal 310 received at array 106. In this example, pointing antenna 106(A) may receive beacon signal 310(A) and pointing antenna 106(B) may receive beacon signal 310(B). As shown in FIG. 5, the phase of beacon signal 310(B) may be offset from the phase of beacon signal 310(A) by a phase difference 502. In one embodiment, this phase difference may be the result of a misalignment between pointing-antenna axis 204 and the pointing-antenna axis of array 306. For example, a misalignment between these axes may cause a slight difference (e.g., a difference of several inches) in the distance between pointing antenna 106(A) and array 306 compared to the distance between pointing antenna 106(B) and array 306. As such, beacon signal 310 may arrive at pointing antenna 106(A) and pointing antenna 106(B) at different places within its sinusoidal cycle.

Processor 404 may determine phase difference 502 based on any suitable phase-comparison technique. In one example, processor 404 may use phase-interferometry formulas to calculate phase difference 502 based on values such as the wavelength of beacon signal 310 and the distance between pointing antenna 106(A) and pointing antenna 106(B) on mount 102 (e.g., a distance 206 shown in FIG. 2). Using phase difference 502, processor 404 may calculate an adjustment to the orientation of pointing-antenna axis 204 that minimizes phase difference 502. For example, processor 404 may determine an angle at which to direct pointing-antenna axis 204 such that the phase of beacon signal 310 received at pointing antenna 106(A) matches the phase of beacon signal 310 received at pointing antenna 106(B).

In some examples, processor 404 may perform similar and/or additional phase-comparison calculations based on the phases of beacon signal 310 received at pointing antennas 106(C) and 106(D). For example, processor 404 may determine an orientation of mount 102 that aligns the phases of beacon signal 310 received at all four pointing antennas 106. In some examples, this orientation may ensure that both the elevation and azimuth angles of pointing-antenna axis 204 and the pointing-antenna axis of array 306 are in alignment.

Orienting mount 102 based on the phases of beacon signal 310 may ensure that pointing-antenna axis 204 is aligned with the pointing-antenna axis of array 306. In the event that pointing-antenna axis 204 is aligned with boresight axis 202 (and the pointing-antenna axis of array 306 is aligned with the boresight axis of antenna 304), this orientation may also align boresight axis 202 with the boresight axis of antenna 304. However, as discussed in connection with FIG. 2, pointing-antenna axis 204 may (due to, e.g., manufacturing tolerances and/or mounting errors) be oriented at an offset relative to boresight axis 202. As such, orienting mount 102 based solely on the phases of beacon signal 310 may, in some examples, result in a misalignment between boresight axis 202 and the boresight axis of antenna 304.

In such examples, physical processing device 110 may identify and then correct the offset between pointing-antenna axis 204 and boresight axis 202. Physical processing device 110 may identify this offset in a variety of ways. In one embodiment, physical processing device 110 may identify the offset by extracting and/or intercepting a signal received at antenna 104 from antenna 304. In particular, physical processing device 110 may extract a Received Signal Strength Indicator (RSSI) signal that indicates the strength of signals transmitted between antenna 104 and antenna 304. Based on this signal, physical processing device 110 may determine an orientation of mount 102 that maximizes the strength of wireless communication signals 308. Physical processing device 110 may then determine the offset between pointing-antenna axis 204 and boresight axis 202 by comparing this orientation with the previously-determined orientation of mount 102 that aligns pointing-antenna axis 204 with the pointing-antenna axis of array 306.

As shown in FIG. 4, physical processing device 110 may include a network interface 406 that is coupled to antenna 104. Network interface 406 generally represents any type or form of connection, portal, or gateway that enables physical processing device 110 to receive at least a portion of signals 308. Network interface 406 may utilize any type or form of network connection, such as a wireless connection or an Ethernet connection. Network interface 406 may also utilize a variety of types of protocols, such as a Simple Network Management Protocol (SNMP) or other standard protocol.

In some embodiments, processor 404 of physical processing device 110 may access the RSSI signal received at antenna 104 via network interface 406. In one example, network interface 406 may sample or extract a high-level version of the RSSI signal. For example, traditional antenna-pointing systems may involve manually adjusting the orientation of antennas based on low-latency (and therefore expensive) RSSI signals. Because physical processing device 110 uses RSSI signals to identify a single, static offset between two axes, physical processing device 110 may implement a slower and/or resource-efficient network interface to access the RSSI signal received by antenna 104.

In some examples, network interface 406 may pass the received RSSI signal to a microprocessor 408 that is contained within and/or connected to digital signal processor 404. Microprocessor 408 may perform any type or form of signal strength analysis on the RSSI signal to determine the orientation of mount 102 that maximizes the strength of wireless communication signals 308. Based on this orientation, processor 404 may identify the offset between pointing-antenna axis 204 and boresight axis 202. Processor 404 may then instruct azimuth drive 412 and/or elevation drive 414 to correct this offset when adjusting the orientation of mount 102. In this way, the disclosed systems may precisely align boresight axis 202 with the boresight axis of antenna 304.

In some embodiments, orienting antenna 104 based on geolocation information included within beacon signal 310 may enable a coarse and/or rough alignment of boresight axis 202 and the boresight axis of antenna 304. For example, identifying the orientation of mount 302 based on GPS coordinates may enable physical processing device 110 to point antenna 104 in the general and/or approximate direction of antenna 304. In contrast, orienting antenna 104 based on a phase-comparison analysis of beacon signal 310 may enable precise alignment of boresight axis 202 and the boresight axis of antenna 304. For example, a phase-comparison analysis of beacon signal 310 may enable physical processing device 110 to align boresight axis 202 and the boresight axis of antenna 304 with a margin of error as low as 0.5° or 1° or less.

In one embodiment, physical processing device 110 may use the geolocation information included within beacon signal 310 to perform an initial orientation of mount 102. Physical processing device 110 may then perform a second orientation of mount 102 based on a phase-comparison analysis on beacon signal 310. In some examples, this second orientation may refine and/or improve the initial orientation of antenna 104. In general, physical processing device 110 may perform any one or combination of the antenna-pointing processes described herein.

Figure 6:
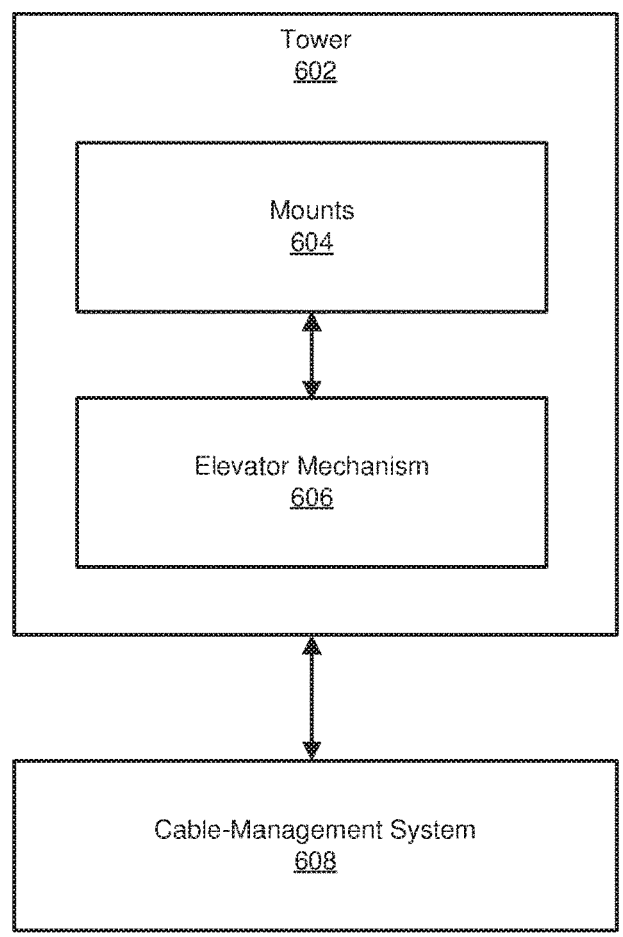
FIG. 6 is an additional block diagram of an exemplary system for pointing wireless communication antennas.

As mentioned above, mount 102 may be hosted on a wireless communication tower. The term "wireless communication tower," as used herein, generally refers to any type or form of structure, stand, or base that secures and/or operates one or more wireless communication mounts. As an example, FIG. 6 illustrates a system 600 that includes a tower 602. In this example, tower 602 may host a set of mounts 604 (which may include mount 102). Tower 602 may also include at least one elevator mechanism 606. Elevator mechanism 606 generally represents any type or form of transportation assembly or device designed to raise, lower, install, and/or otherwise reposition a wireless communication mount. Elevator mechanism 606 may enable both horizontal and vertical movement of a mount.

In one embodiment, elevator mechanism 606 may be controlled at least in part by a cable-management system 608. Cable-management system 608 generally represents any software and/or hardware system that directs and/or operates elevator mechanism 606. In one embodiment, cable-management system 608 may include at least one physical processing device that determine locations at which to install mounts 604 on tower 602. This physical processing device may also direct elevator mechanism 606 to install mounts 604 at the determined locations.

Figure 7:
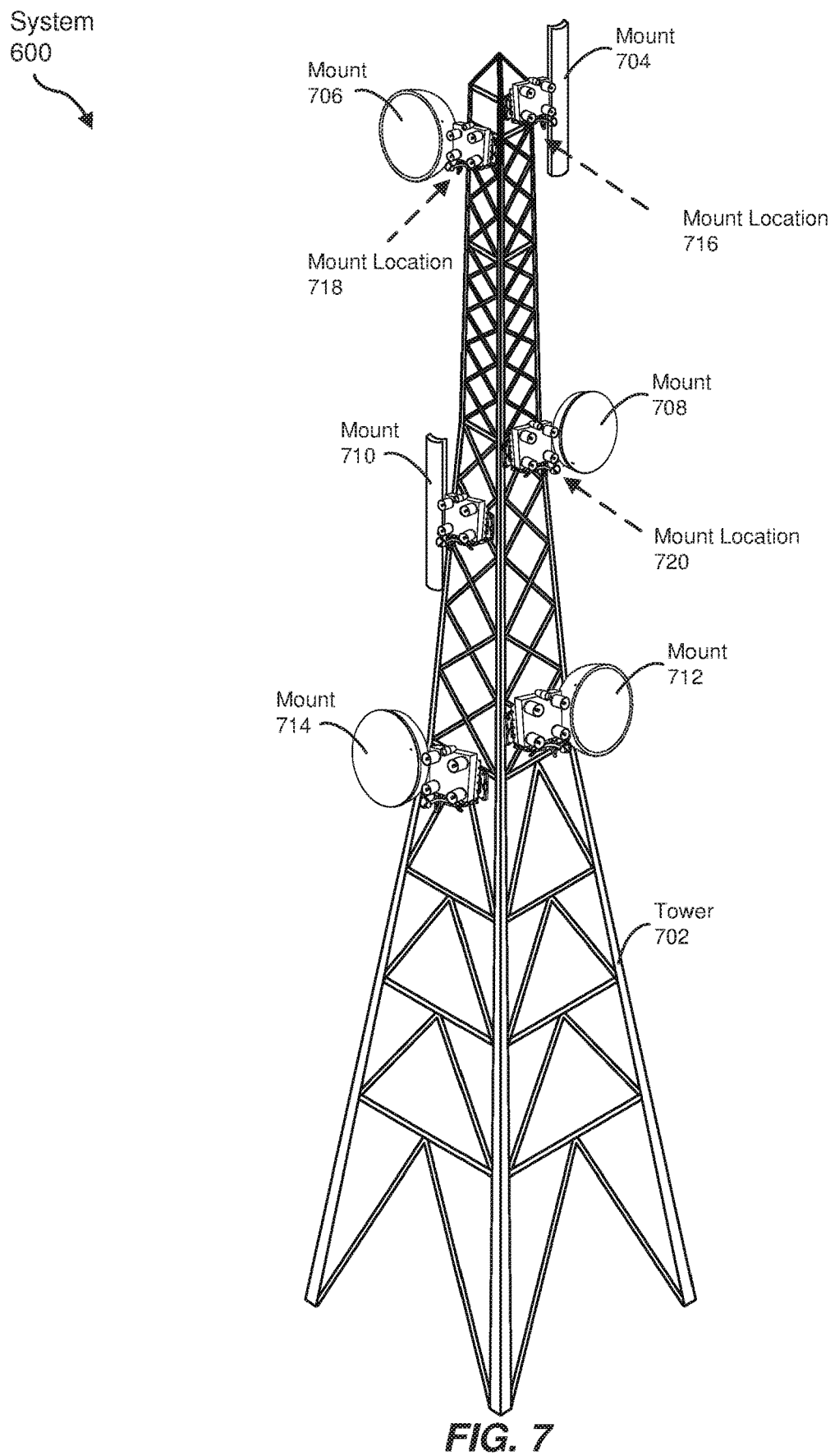
FIG. 7 is an illustration of an exemplary system for pointing wireless communication antennas.

FIG. 7 illustrates an example embodiment of system 600. Specifically, FIG. 7 shows a tower 702 that hosts multiple mounts, including mounts 704, 706, 708, 710, 712, and 714. These mounts may be installed on tower 702 at various mount locations, such as mount locations 716, 718, and 720.

Mounts 704, 706, 708, 710, 712, and 714 may be capable of hosting a variety of types of wireless communication antennas. For example, FIG. 7 shows three different types of antennas (i.e., one type of antenna hosted on mounts 704 and 710, another type of antenna hosted on mounts 706 and 712, and an additional type of antenna hosted on mounts 708 and 714). In some embodiments, each mount on tower 702 may be capable of hosting each type of antenna. For example, each mount may be designed to secure and/or point antennas of various shapes, structures, and designs, as well as antennas manufactured by various wireless communication vendors.

In some embodiments, the components of each mount besides the wireless communication antenna (such as the array of pointing antennas, the physical processing device, etc.) may generally be similar or identical. For example, each mount may represent a universal mount designed to interchangeably host a variety of types of antennas without requiring adjustments or modifications to the software and/or hardware elements used to orient the antennas.

In some examples, the various mount locations on tower 702 may facilitate various levels of performance for wireless communication antennas. For example, a mount location positioned near the top of tower 702 (such as mount location 716) may enable a greater transmission range and/or coverage area than a mount location positioned closer to the base of tower 702 (such as mount location 720). In addition, different mount locations may be directed towards different geographic and/or demographic areas. As an example, mount location 718 may be directed towards a heavily-populated area, while mount location 716 may be directed towards a sparsely-populated area. As such, an antenna installed at mount location 718 may be tasked with a greater load than an antenna installed at mount location 716.

In some embodiments, a mount hosted on tower 702 may be installed independently of at least one additional mount hosted on tower 702. For example, cable-management system 608 may direct elevator mechanism 606 to transport mount 704 to mount location 716. While mount 704 is installed at mount location 716, cable-management system 608 may direct elevator mechanism 606 (or an additional instance of elevator mechanism 606) to transport mount 708 to mount location 720. In other words, mount 708 may be installed, serviced, and/or removed from tower 702 without disrupting or interfering with the placement and/or operation of mount 704 (or any additional mount hosted on tower 702).

In some examples, one or more antennas installed on tower 702 may be owned and/or managed by a wireless communications enterprise. Examples of wireless communications enterprises include, without limitation, mobile service providers, Internet service providers, radio stations, television networks, broadcasting organizations, and/or any additional individual or organization that utilizes wireless communication signals. In one embodiment, all of the antennas on tower 702 may be managed by the same enterprise. Alternatively, tower 702 may host antennas that are managed by various enterprises.

In addition, tower 702 may be managed by a wireless communications tower enterprise that is different than all or a portion of the enterprises that manage the antennas installed on tower 702. For example, the enterprise that manages tower 702 may charge a fee (e.g., rent) to install and/or host an antenna on behalf of a third-party wireless communications client.

An enterprise that manages tower 702 may utilize the disclosed systems to provide a variety of services for third-party wireless communication clients. For example, elevator mechanism 606 may enable rapid installation and uninstallation of individual wireless antennas on tower 702. As such, a wireless communications client may frequently and/or easily add and remove antennas hosted on wireless communication towers (e.g., based on changes in communication services requested by consumers). In addition, the automated installation and mounting processes provided by elevator mechanism 606 and mount 102 may greatly reduce the expenses incurred by wireless communication tower enterprises to host and maintain wireless communication antennas. In some examples, these savings may be passed on to third-party communication enterprises.

In some embodiments, the disclosed systems may alert a wireless communication client about changes and/or malfunctions concerning one or more antennas managed by the client. For example, an instance of physical processing device 110 coupled to a mount on tower 702 may detect a change in the health status of an antenna hosted on the mount. Physical processing device 110 may detect this health status change in a variety of ways, such as by continuously monitoring the ability of the antenna to transmit signals and/or by periodically performing health scans on the antenna. After detecting the change, physical processing device 110 may notify an enterprise and/or technician that manages the antenna (by, e.g., causing an antenna to transmit a notification of the same to the enterprise and/or technician).

Cable-management system 608 may select a mount location for an antenna on tower 702 based on a variety of factors. In one embodiment, cable-management system 608 may determine an installation location for an antenna based on one or more properties and/or characteristics of a client that manages the antenna. As an example, cable-management system 608 may identify an amount of rent paid by the client to host the antenna on tower 702. Cable-management system 608 may then select a mount location that facilitates a level of performance corresponding to the amount of rent. For example, cable-management system 608 may assign more valuable (e.g., higher-performance) mount locations to clients that pay a higher amount of rent than to clients that pay a lower amount of rent. Additionally or alternatively, cable-management system 608 may select a mount location for an antenna managed by a client by identifying a location that enables the antenna to provide wireless communication services for a geographic area serviced by the client.

Furthermore, cable-management system 608 may select a mount location for an antenna that reduces and/or minimizes interference between signals transmitted by the antenna and signals transmitted by one or more additional antennas hosted on tower 702. For example, cable-management system 608 may select a mount location for an antenna that maximizes the distance between the antenna and other antennas hosted on tower 702.

After a mount has been installed on tower 702, elevator mechanism 606 may reposition and/or adjust mount 102 in response to a variety of inputs or contexts. In one example, cable-management system 608 may detect a change in wireless communication services required within a geographic area serviced by an antenna hosted on tower 702. For example, cable-management system 608 may determine that the wireless communication services consumed in a particular geographic area vary based on factors such as the time of day, day of the week, season, etc. As such, cable-management system 608 may direct elevator mechanism 606 to dynamically reposition one or more antennas hosted on tower 702 such that the antennas effectively meet these varying demands for wireless communication services.

In another example, cable-management system 608 may direct elevator mechanism 606 to reposition a mount in response to detecting, within the transmission path or range of an antenna, an obstacle (such as a building or other wireless communication tower) capable of interfering with signals transmitted by the antenna. For example, in response to determining that the strength of signals received by an antenna on tower 702 has decreased, elevator mechanism 606 may relocate the antenna to another mount location that facilitates greater signal transmission.

As explained above in connection with FIGS. 1-7, the disclosed smart mount and smart tower systems may enable efficient, automated installation and orientation of wireless communication antennas. In one example, an elevator mechanism incorporated into a smart tower may raise and install a smart mount that hosts an antenna. This antenna may be configured to communicate with a remote antenna (e.g., via signals corresponding to a certain frequency range). In one embodiment, the remote antenna may also be installed on a smart tower and secured on a smart mount. A pointing-antenna array on at least one of the smart mounts may transmit a beacon signal (e.g., a monopulse radar signal) that indicates the location and/or orientation of the pointing-antenna array. In one embodiment, the frequency of this signal may be outside of the frequency range utilized by the antennas. Based on the signal, the smart mounts may adjust and/or orient themselves such that the boresight axes of the two antennas are in alignment.

By raising, installing, and orienting antennas automatically, the disclosed smart mount and smart tower systems may eliminate the need for technicians to climb wireless communications towers. In addition, the disclosed systems may enable wireless communication clients that manage antennas hosted on the smart towers to provide efficient, flexible, and/or inexpensive wireless communication services.

FIG. 8 is a flow diagram of an example method 800 for pointing wireless communication antennas. In one example, each of the steps shown in FIG. 8 may represent an algorithm whose structure includes and/or is represented by multiple sub-steps, examples of which will be provided in greater detail below.

At step 810 of method 800, one or more of the apparatuses or systems described herein may receive, by an array of pointing antennas coupled to a mount that secures a wireless communication antenna, a beacon signal that indicates a location of a remote array of pointing antennas. In one example, the remote array of pointing antennas may be coupled to a remote mount that secures a remote wireless communication antenna. In addition, the remote array of pointing antennas may transmit the beacon signal via a different communication channel than a communication channel used by the wireless communication antenna. For example, the communication channels may transmit wireless signals whose frequencies correspond to different frequency ranges.

Step 810 may be performed in a variety of ways. In one example, this step may be performed while establishing and/or configuring the communication channel between the wireless communication antenna and the remote wireless communication antenna. For example, after the wireless communication antenna and the remote wireless communication antenna have been installed on separate wireless communication towers, the remote array of pointing antennas may transmit the beacon signal to the array of pointing antennas. Once received, this signal may be monitored and/or analyzed by a processing device dedicated to identifying and adjusting the orientation of the wireless communication antenna At step 820 of method 800, one or more of the apparatuses or systems described herein may determine, based at least in part on the received beacon signal, an orientation of a boresight axis of the wireless communication antenna relative to a boresight axis of the remote wireless communication antenna.

Step 820 may be performed in a variety of ways. In one example, this step may be performed based on geolocation data (e.g., GPS/INS data) that is contained within the beacon signal. Specifically, the processing device that monitors the received beacon signal may determine that the beacon signal contains GPS coordinates that identify the location of the remote mount. The processing device may then determine the orientation of the boresight axis of the wireless communication antenna relative to the boresight axis of the remote wireless communication antenna based on a comparison between the GPS coordinates of the remote mount and GPS coordinates of the mount.

Additionally or alternatively, the processing device may determine the orientation of the boresight axis of the wireless communication antenna relative to the boresight axis of the remote wireless communication antenna based on an analysis of the phases of the beacon signal received at the array of pointing antennas. For example, the processing device may perform a phase-comparison analysis on the instances of the beacon signals received at all or a portion of the pointing antennas to determine an orientation of the array of pointing antennas relative to the remote array of pointing antennas.

At step 830 of method 800, one or more of the apparatuses or systems described herein may orient the mount such that the boresight axis of the wireless communication antenna aligns with the boresight axis of the remote wireless communication antenna. In this way, the disclosed apparatuses and systems may maximize signal transmission between the wireless communication antenna and the remote wireless communication antenna.

Step 830 may be performed in a variety of ways. In one example, this step may be performed by adjusting the position, angle, and/or tilt of the mount via one or more motorized drives that are coupled to the mount. Specifically, the processing device may direct the motorized drives to adjust the horizontal and/or vertical angles at which the mount is oriented such that the boresight axis of the wireless communication antenna aligns with the boresight axis of the remote wireless communication antenna.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the systems described herein may transform data, physical devices, and/or representations of physical devices from one form to another. For example, one or more of the systems recited herein may receive a beacon signal from a remote array of pointing antennas to be transformed, transform the beacon signal into an orientation of a boresight axis of a wireless communication antenna relative to a boresight axis of a remote wireless communication antenna, output a result of the transformation to align the boresight axes, and use the result of the transformation to maximize signal transmission between the wireless communication antenna and the remote wireless communication antenna. Additionally or alternatively, one or more of the systems recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a mount that secures:
      a wireless communication antenna configured to transmit, via a communication channel of a first frequency range, wireless communication signals to a remote wireless communication antenna that is secured on a remote mount; and
      an array platform fixed adjacent to the wireless communication antenna, wherein the array platform is configured to secure an array of pointing antennas such that a boresight axis of the wireless communication antenna and a boresight axis of the pointing antennas are substantially parallel to one another, the array of pointing antennas receiving, from a remote array of pointing antennas mounted on the remote mount, a beacon signal that indicates a location of the remote array of pointing antennas via a different communication channel of a second frequency range;
   at least one motorized drive configured to physically orient the mount; and
   a physical processing device that is communicatively coupled to the motorized drive, wherein the physical processing device is configured to:
      determine, based at least in part on the received beacon signal, an orientation of the boresight axis of the wireless communication antenna relative to a boresight axis of the remote wireless communication antenna; and
      direct the motorized drive to orient the mount such that the boresight axis of the wireless communication antenna aligns with the boresight axis of the remote wireless communication antenna.

2. The apparatus of claim 1, wherein the different communication channel used by the remote array of pointing antennas transmits wireless communication signals whose frequencies are within a different frequency range than a frequency range of the wireless communication signals transmitted via the communication channel used by the wireless communication antenna.

3. The apparatus of claim 1, wherein:
   the beacon signal includes geolocation data that identifies the location of the remote array of pointing antennas; and
   the physical processing device directs the motorized drive to point the mount towards the remote mount based on the geolocation data.

4. The apparatus of claim 3, wherein the geolocation data comprises at least one of:
   Global Positioning System (GPS) data; or
   Inertial Navigation System (INS) data.

5. The apparatus of claim 1, wherein the beacon signal comprises a monopulse radar signal.

6. The apparatus of claim 5, wherein:
   the array of pointing antennas comprises at least two pointing antennas that each receive the monopulse radar signal; and
   the physical processing device:
      determines, for each pointing antenna within the array of pointing antennas, a phase of the monopulse radar signal received at the pointing antenna; and
      determines the orientation of the boresight axis of the wireless communication antenna relative to the boresight axis of the remote wireless communication antenna based on a comparison between the determined phases.

7. The apparatus of claim 6, wherein the physical processing device directs the motorized drive to orient the mount such that the phases of the monopulse radar signal received at each pointing antennas align with each other.

8. The apparatus of claim 1, wherein:
   the wireless communication antenna and the array of pointing antenna are rigidly mounted adjacently to each other on the mount; and
   the physical processing device determines an offset of the boresight axis of the wireless communication antenna relative to an axis of the array of pointing antennas.

9. The apparatus of claim 8, wherein the physical processing device determines the offset of the boresight axis relative to the axis of the array of pointing antennas by:
   determining, based on the received beacon signal, an orientation of the mount that aligns the axis of the array of pointing antennas with an axis of the remote array of pointing antennas;
   performing a signal strength analysis on a wireless communication signal transmitted between the remote wireless communication antenna and the wireless communication antenna; and determining, based on the signal strength analysis, an adjustment to the orientation of the mount that maximizes the strength of the wireless communication signal.

10. The apparatus of claim 9, wherein the physical processing device directs the motorized drive to correct the offset of the boresight axis of the wireless communication antenna relative to the axis of the array of pointing antennas based on the determined adjustment to the orientation of the mount.

11. The apparatus of claim 1, wherein the motorized drive comprises at least one of:
an azimuth drive that adjusts a horizontal orientation of the mount; or
an elevation drive that adjusts a vertical orientation of the mount.

12. The apparatus of claim 1, wherein the mount is hosted on a tower that hosts at least one additional mount.

13. The apparatus of claim 12, wherein the tower comprises an elevator mechanism that:
transports the mount between a base of the tower and a location at which the mount is installed on the tower; and
transports the mount independently of the additional mount.

14. A system comprising:
a tower;
a mount that is hosted on the tower and that secures:
a wireless communication antenna configured to transmit, via a communication channel of a first frequency range, wireless communication signals to a remote wireless communication antenna that is secured on a remote mount;
an array platform fixed adjacent to the wireless communication antenna, wherein the array platform is configured to secure an array of pointing antennas such that a boresight axis of the wireless communication antenna and a boresight axis of the pointing antennas are substantially parallel to one another, the array of pointing antennas receiving, from a remote array of pointing antennas mounted on the remote mount, a beacon signal that indicates a location of the remote array of pointing antennas via a different channel of a second frequency range;
at least one motorized drive configured to physically orient the mount;
a physical processing device that is communicatively coupled to the motorized drive, wherein the physical processing device is configured to:
determine, based at least in part on the received beacon signal, an orientation of the boresight axis of the wireless communication antenna relative to a boresight axis of the remote wireless communication antenna; and
direct the motorized drive to orient the mount such that the boresight axis of the wireless communication antenna aligns with the boresight axis of the remote wireless communication antenna; and
an elevator mechanism configured to:
transport the mount between a base of the tower and a location at which the mount is installed on the tower; and
transport the mount on the tower independently of at least one additional mount that is hosted on the tower.

15. The system of claim 14, wherein the physical processing device:

determines a health status of at least one component secured to the mount; and
communicates the health status to a wireless communications enterprise that manages the component.

16. The system of claim 14, wherein the tower comprises a cable-management system that includes at least one additional physical processing device, wherein the additional physical processing device:
determines locations at which to install mounts hosted by the tower; and
directs the elevator mechanism to install the mounts at the determined locations.

17. The system of claim 16, wherein the cable-management system directs the elevator mechanism to install the additional mount at a location that reduces interference between the wireless communication signals transmitted by the wireless communication antenna and wireless communication signals transmitted by an additional wireless communication antenna that is secured on the additional mount.

18. The system of claim 16, wherein the cable-management system directs the elevator mechanism to adjust the location at which the mount is installed on the tower based on at least one of:
detecting a change in wireless communication services required within a coverage area serviced by the wireless communication antenna; or
identifying, between the wireless communication antenna and the remote wireless communication antenna, an obstacle capable of interfering with the wireless communication signals transmitted by the wireless communication antenna.

19. The system of claim 16, wherein:
the tower provides a plurality of mount installation locations that facilitate various levels of performance for wireless communication antennas;
a communications tower enterprise that manages the tower charges a higher amount of rent to install wireless communication antennas at locations that facilitate a higher performance level than an amount of rent charged to install wireless communication antennas at locations that facilitate lower performance levels; and
the cable management system directs the elevator mechanism to install the mount at a location that facilitates a performance level corresponding to an amount of rent paid by a communications tower client that manages the mount.

20. A method comprising:
receiving, by an array of pointing antennas coupled to an array platform, a beacon signal that indicates a location of a remote array of pointing antennas, wherein:
the array platform is fixed adjacent to a wireless communication antenna by a mount that secures the array of pointing antennas such that a boresight axis of the wireless communication antenna and a boresight axis of the pointing antennas are substantially parallel to one another;
the remote array of pointing antennas is coupled to a remote mount that secures a remote wireless communication antenna; and
the remote array of pointing antennas transmits the beacon signal via a different communication channel of a second frequency range than a communication channel of a first frequency range used by the wireless communication antenna;
determining, based at least in part on the received beacon signal, an orientation of the boresight axis of the wireless communication antenna relative to the boresight axis of the remote wireless communication antenna; and orienting the mount such that the boresight axis of the wireless communication antenna aligns with the boresight axis of the remote wireless communication antenna.

\* \* \* \* \*